H. O. CHUTE.
ART OF WOOD DISTILLATION.
APPLICATION FILED MAY 23, 1910. RENEWED MAY 19, 1917.
1,250,282.
Patented Dec. 18, 1917.
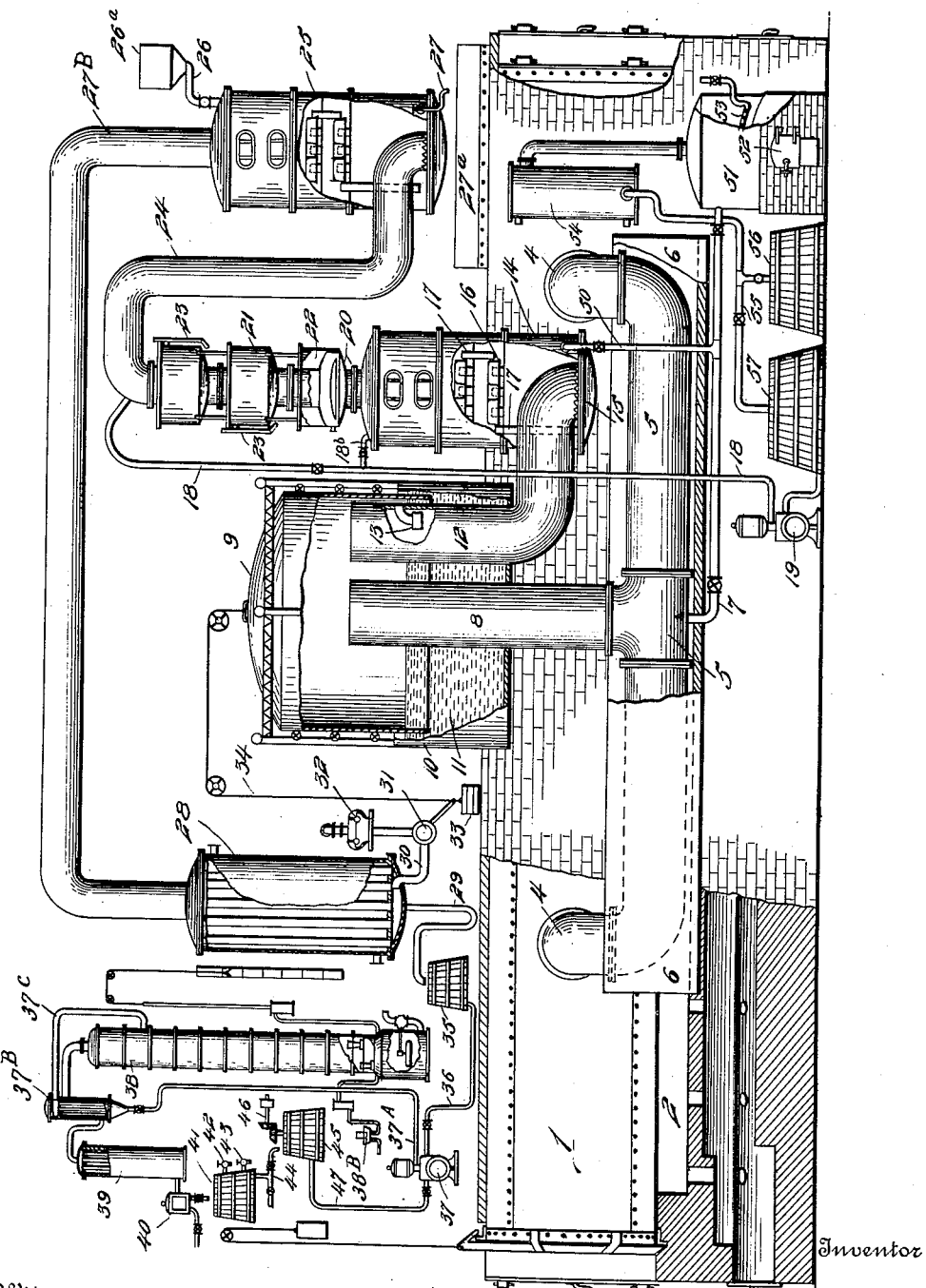
Witnesses
Inventor
H. O. Chute
By K. P. McElroy
Attorney

UNITED STATES PATENT OFFICE.

HARRY O. CHUTE, OF NEW YORK, N. Y., ASSIGNOR TO K. P. McELROY, OF WASHINGTON, DISTRICT OF COLUMBIA.

ART OF WOOD DISTILLATION.

1,250,282.   Specification of Letters Patent.   Patented Dec. 18, 1917.

Application filed May 23, 1910, Serial No. 563,004. Renewed May 19, 1917. Serial No. 169,780.

*To all whom it may concern:*

Be it known that I, HARRY O. CHUTE, a citizen of the United States, residing at New York, in the county of New York and State of New York, have invented certain new and useful Improvements in the Art of Wood Distillation, of which the following is a specification.

This invention relates to the art of wood distillation; and it comprises a method of destructively distilling wood and regaining the by-products therefrom wherein wood or other vegetable material is destructively distilled in retorts under constant pressure, said pressure being controlled independently of the amount of incondensable gaseous products formed, the gaseous effluent from the distillation is passed through a temperature-controlled channel to regulate its temperature, is then systematically washed and purified by a countercurrent of tarry or oily bodies, is then freed of its acetic acid by neutralization with a body of alkaline material maintained at a comparatively high temperature to form an acetate solution and is thereafter treated to regain wood spirit, said wood spirit being subsequently purified; and it also comprises an assemblage or organization of apparatus elements comprising a retort, means for withdrawing effluent vapors therefrom and controlling the pressure therein, a temperature-regulating device receiving the effluent gases, means for distilling tar, means for systematically scrubbing the effluent gases with the distillate obtained, means for recovering the acetic acid from the purified gases in the form of a concentrated acetate solution, means for thereafter recovering wood spirit, means for purifying said wood spirit, and means for withdrawing incondensable gases, said means being connected to said pressure controlling means; all as more fully hereinafter set forth and as claimed.

In the destructive distillation of wood and the like, the products obtained are many and of varied nature, but for the present purposes they may be regarded as consisting mainly of permanent gases, water, wood spirit, acetic acid, hydrocarbons, tar oils, keytones, and tar. The wood spirit is a mixture consisting for the most part of methyl alcohol and acetone with some "methyl acetone" and methyl acetate. The tar and tar oils are complicated mixtures of hydrocarbons, phenols, aldehydes, esters and less known tarry and oily bodies.

In this country the distillation is ordinarily performed in externally heated retorts, the kiln processes in which air is drawn through the mass of wood to be distilled being less frequently used. The retorts employed are often very large, sometimes reaching 45 and 50 feet in length. Into these long retorts the wood is frequently run on cars. The nature of the product obtained in wood distillation depends considerably upon the pressure prevailing within the retort and with a retort of any size it is difficult to control this pressure. The gases and vapors distilled from the wood do not come off evenly but in different amounts at different times. It is, furthermore, difficult to prevent leaks in the retort, and for this reason it is as a rule better to conduct the distillation at as near atmospheric pressure as possible. In the present invention I have devised means for controlling this pressure which may be used either to maintain pressures above or below the atmosphere within the retort or to keep the retort in equilibrium with the pressure of the atmosphere whatever the temporary rate of delivery of products of distillation may be.

In the usual procedure of recovering the products of wood distillation, the distillate is cooled and condensed as a whole, the permanent gases alone remaining uncondensed. The distillate from hard woods on standing separates into two layers; one being "tar" containing more or less acid and wood spirit, and the other being crude pyroligneous acid. The pyroligneous acid contains the acetic and other acids and the wood spirit together with tarry and oily bodies in solution and suspension. It is always separated gravitally from the tar as cleanly as possible, but it nevertheless always still contains a considerable quantity of impurities.

The principal problem in the art of wood distillation is that of recovering the main valuable products, the wood spirit and the acetic acid in as pure a state as possible with the minimum of manipulation and labor and fuel. The acetic acid is always recovered as an acetate; generally as acetate of lime.

In this recovery the main difficulty is in eliminating the tar and tarry bodies which are found to be separated at every step. With the varied nature of the components of the tar, some of the constituents are apt to go forward and contaminate all the products whatever method of recovery be adopted. One method of recovery much used is to distil the acid as a whole, leaving much of the contained tar behind in the retort. The distillate on neutralization yields an impure alcoholic distillate needing much rectification and purification before it can be made a merchantable article. After removing the wood spirit, the water is evaporated off, leaving gray acetate; gray acetate of lime, for example. Another method is to neutralize the whole mass of pyroligneous acid, distil off the alcohol from the neutralized liquid as before and then evaporate down to obtain "brown acetate". This yields a very impure acetate and an equally impure wood spirit; the latter, under the circumstances, containing foul smelling amins. A better method now much used is to perform a systematic distillation, first distilling off a fraction of the pyroligneous acid to obtain a midstrength acid alcoholic distillate running between 10 and 25 per cent. apparent alcoholic strength. Under the laws governing the distillation of immiscible fluids, in the distillation much of the tarry and oily matter insoluble in a distillate of this character goes forward with the distillate and on allowing it to stand can be settled out. On now neutralizing the liquid or making it alkaline, a further amount of impurities may be separated and settled out; an excess of alkali appearing to resinify the soluble impurities or some of them and to cause a separation. After the second separation, the alcohol may now be redistilled to make a merchantable article freely miscible with water. The acid remaining in the still after distilling off the acid alcohol is now purer, the alcohol having carried over a considerable amount of the impurity, and it can be distilled to give an acid of much purer nature, the non-volatile tars remaining behind in the still. Preferably in this second distillation the acid vapors are condensed in the heating chambers of a multiple effect apparatus used to evaporate the acetate solution formed by neutralizing such condensed acid.

The present method is in line with that just described in that it methodically removes as much of the impurities at each stage as possible. It comprises obtaining the original distillate from the wood of more uniform composition by regulating the pressure in the retort, methodically lowering the temperature of the products of destructive distillation somewhat to condense out part of the tar and then systematically scrubbing the gases, which are still hot and above the condensing point of either acid or alcohol, with a countercurrent of distilled oils from tar. In the gaseous product leaving the still, at all moderate temperatures probably much of the true tar is not in a state of vapor but is liquid, being in the form of fine droplets or particles entrained and carried forward by the rushing current of gases. By contacting with a washing or scrubbing body of oil, most of these suspended particles can be removed while the scrubbing oil also dissolves and retains more volatile oily and tarry substances, so that the body of gases and vapors is also still further purified by a true solvent action. This body of wash oil is best obtained by a methodical distillation of the tar recovered from the operation itself.

In the scrubbing operation preferably the temperature of the gases under treatment is maintained at as low a point as possible without reaching the condensing point of pyroligneous acid, both because more of the volatile components of tar can be condensed and dissolved out the lower the temperature is and because at a comparatively low temperature, just above the boiling point of pyroligneous acid, the scrubbing can be effected in efficient countercurrent apparatus of the nature of a column still without danger of twisting and warping it; a serious matter when the still is made of copper. Copper is the best material to employ, both because it is freely heat conductive, therefore allowing an efficient still action, and because it is not attacked by acetic acid or the tar acids as is iron. The temperature of the gases being scrubbed should however be substantially above the condensing point of the pyroligneous acid.

Operating in this manner, the gases going to and through the scrubbing apparatus are somewhat above 100° C. and they can next be passed through or against a body of alkali, such as milk of lime, in a countercurrent apparatus and the acetic acid condensed out as a body of concentrated acetate solution, merely enough water condensing to dissolve this acetate. Owing to the efficient preliminary scrubbing, this acetate solution will be fairly pure and may be directly concentrated to obtain the 82 per cent. acetate. It is obviously better, once having the water of the products of destructive distillation in the form of vapor to maintain it as such, condensing out merely the acid rather than condensing both water and acid and subsequently re-evaporating the water.

Under the conditions described, while the acetic acid condenses, the alcohol and the bulk of the water go forward. They may next be condensed together by any suitable condenser, giving a weak alcoholic distillate. Strong alcohol may be directly distilled from this condensate and afterward rectified to give a pure article. It is however better to distil the condensate to obtain a midstrength article between 10 and 25 per cent. apparent alcohol content as tested by the alcoholometer and purify it prior to making the stronger alcohol. This midstrength distillate will be neutral, the alcohol vapors having passed through lime. From this neutral distillate some oil will separate and this should be removed. On weakly acidifying with a little acetic acid, a further separation of impurities can be attained, the liquid now being made of the character of that obtained by the direct distillation of pyroligneous acid to obtain the midstrength acid distillate in the prior process hereafter described. After the acidification the liquid may be again neutralized, or, and better, made alkaline with an alkali, such as lime. In the presence of this alkali a further amount of impurities is separated, this separation being probably due to polymerization and resinification. After removing the separated impurities the liquid can now be fractionated to obtain a strong, comparatively pure alcohol freely miscible with water without separation of impurities, or, what is termed in the trade, a "non-milking" alcohol.

After the condensation of the alcohol and water as described the incondensable gases can be removed and may be utilized for heating the retorts, being combustible in character. In removing these incondensable gases they may be taken out through a suction fan. This suction fan produces a suction throughout the entire system extending to the retort and its action may be controlled by the evolution of gas in the retort, the gases and vapors coming from the retort being passed into a gas bell. In the scrubbing operation the character of the oil used as a wash oil is not a matter of indifference The best effects are obtained by using a certain fraction of the oils distilled from the tar recovered in the operation itself.

In a typical and complete installation under the present process, the gases coming from the retort may be passed through a cooled conduit. In this conduit a large part of the tar separates and accumulates. From the conduit the gases may be passed into a bell floating in a bath of tar and tar oils. From this bell the gases may be taken by a conduit and caused to bubble through tar or tar oils. In this scrubbing treatment the temperature should be maintained at a temperature above the condensing point of the pyroligneous acid which is, of course, also above the condensing temperature of water or wood spirit. From the oil scrubbing operation the gases may next be led through an apparatus wherein they may be scrubbed with an alkaline liquid at a temperature appropriate to form acetate solution without condensing the alcohol and water. From this neutralizing scrubbing the gases and vapors may be led to a condenser, alcohol and water condensed out and the remaining incondensable gases led past a valve by a suction fan, the valve being connected to the gas bell and regulated thereby.

In the accompanying illustration I have shown, more or less diagrammatically, an assemblage of apparatus elements within the present invention and useful in performing the described processes. In this showing the figure represents a view partly in vertical section and partly in elevation of a complete installation. Element 1 is a retort, shown as of the long horizontal type heated by fire flues 2. This retort is inclosed in the brick chamber (shown broken away) 3. Tapping the retort at a plurality of points are outlets 4, communicating with a gas and vapor main 5, lying in a temperature controlling casing 6. The temperature within this casing may be kept constant by sprinkling the conduit with water from suitable means (not shown), or by maintaining a bath of high boiling liquid, such as a solution of calcium chlorid, within the casing. Tapping the conduit at its lowest point is a valved pipe 7 leading to a tar still. From an upper point in the conduit leads pipe 8 ending beneath a gas bell 9. This gas bell plays within a housing 10 containing a bath of tar or other liquid 11. Also ending within the gas bell is a conduit 12, carrying an overflow device 13 consisting of a pipe sealed by a cup, whereby the excess of the accumulating tar may be tapped into this conduit. This overflow device 13 comprises a curved pipe, the upper end communicating with the interior of gas bell 9 through the orifice in the periphery of conduit 12 while the lower end communicates with the interior of conduit 12. When the level of the bath in housing 10 and bell 9 rises beyond this orifice, the excess of tar flows through pipe 13 into conduit 12. This conduit 12 takes vapors and gases and overflowing tar from tank 10 into a scrubbing device 14. The lower end of the conduit may be serrated as at 15 and raised from the floor of this apparatus, which is of the well known countercurrent type and in structure is much like a column still carrying shelves and inverted cups 16, and overflows 17. It is provided with means 18$^b$ and 19 for delivering tar oils to the upper shelves. At its upper end conduit 20 takes the scrubbed gases and vapors through another scrubber 21, which also serves as a temperature regulator and which is of the general type of the well known Burcey pan, being provided with chambers 22 for cooling fluid and is also supplied with tar oils through 18. As shown, this scrubber has three compartments for the cooling fluid communicating through pipes 23. The scrubbed gases leaving the Burcey pans go through conduit 24 into a neutralizer 25. This neutralizer is also of the well known countercurrent type and has the general internal construction of a column still, being provided with cups and plates or like devices. Alkali, such as milk of lime, is fed into it through pipe 26, from tank 26ª, and neutralized liquid is removed through valved pipe 27 to drying pan 27ª. The temperature of this apparatus (25) is kept at such a point that acetic acid will condense or be absorbed and form a strong solution of acetate while the main body of the alcohol and water remain uncondensed and go forward. The uncondensed gases and vapors leave the neutralizer through pipe 27ᵇ, leading to condenser 28, which is of an ordinary type. From the condenser, the condensed alcohol and water are removed by sealed pipe 29 while uncondensed gases go through pipe 30, past valve 31, to suction device 32 and thence to a point of use. The valve is provided with counterbalanced weight 33 and cord 34 connected to the top of the gas bell. The valve being thus connected with the gas bell, when the gases flow from the retort and fill the bell its rising opens the valve through the cord connection, whereby the fan or other suction device used automatically draws the gases through the mechanism in the direct ratio of their formation. The suction device may be run at constant speed by any form of motor. The condensed water and wood spirit or alcohol pass from the condenser into the holding tank 35, and thence through pipe 36, pump 37, pipe 37ᴬ, heat exchanger 37ᴮ and pipe 37ᶜ, to the continuous refining still 38 where it is brought to the form of a mid-strength alcoholic distillate of between 10 and 25 per cent. of apparent alcoholic content. Tester 38ᴮ allows control of the operation of the still. This distillate goes through condenser 39 and trybox 40, and passes into the settling tub 41 provided with valved outlets 42 and 43 at different heights, through which settled oily impurities may be removed. It may be advisable to acidify the contents of the settler to promote separation of oils or this may be done in a separate vessel. Valved outlet 44 serves to draw off the aqueous layer or "dilute wood spirit" to tank 45, provided with stirrer 46, wherein the liquid is mixed with an alkali, preferably lime. The amount of admixture may be merely sufficient to bring the liquid to neutrality but preferably is enough to make it alkaline. Alkalinity by causing a resinification and polymerization of impurities, promotes purification. The impurities separated may be deposited in this tank. The liquid is decanted through the pipe 47 and is again passed through the fractionating continuous still 38 which now acts as a secondary still when a distillate of more than 82 per cent. alcoholic content and perfectly miscible with water will emerge from the condenser 39 which condensate may be barreled for shipment. Returning to the tar separating devices, the tar which condenses in the gas bell overflows into the conduit (12) when the level reaches a determined height. The overflowing tar goes into the scrubber (14) and passes out with the tar oil which accumulates in this apparatus through valved pipe 50 which communicates with a pipe leading into the tar still 51. This tar still is provided with a fireplace 52, perforated steam pipe 53, condenser 54, and valved pipe 55, and by its means the tar may be separated into fractions of different boiling point and of different natures in the presence or absence of steam or water vapor. These different condensates may be led into separate tanks 56 and 57.

In operating the apparatus the cord wood is placed in cars of iron or steel and shoved into the retort 1 and a fire is built in fireplace 2 which is arched over to allow of even distribution of the heat to the retort. The gases emerge through the pipes 4 as soon as a carbonizing temperature is reached in the retort and pass through the temperature-regulating device 6 where they are cooled as low as possible without condensing water or acids. Thence the gases and vapors pass to the bell 9. This is so weighted that it moves up and down according to the predetermined pressure it is fixed to carry and in so doing it opens the valve 31 through the cord mechanism 34 as the bell rises. This allows the suction fan 32 to form a partial vacuum which serves to withdraw the gas from 9 as rapidly as it enters. In this bell there is always an accumulation of tarry and liquid matter forming and serving as a seal. The excess of tar passes out through the orifice 13 and follows the gas which passes through 12 to the scrubber 14 which has a layer of tar oils on each plate and on the bottom. In passing into this apparatus the gases escape as small bubbles past the serrated edge of the conduit 12 and thus bubble through the layer of tar oils in the bottom of 14. Passing up through the scrubber the process is repeated in each higher chamber in the well known way; this manner of passing a gas against a countercurrent of liquid being used in many industries, such as in making illuminating gas, the so-called "ammonia soda process," the fractional distilling process and others. When the gas reaches the top of the first scrubber, it is passed through the other combined scrubbing, cooling and temperature controlling arrangement which is a series of pans arranged to pass the gas in a tortuous manner past a series of surfaces carrying downflowing tar oils and on the other side of which is a cooling fluid, whereby the gas is scrubbed and brought in contact with the progressively cooler surfaces. This apparatus is of the type known in the wood distilling art as Burcey pans. The tar oils flow through 20 into 14. The composition of the liquid which flows in the countercurrent and which serves to scrub the gas is of some importance. The best scrubbing fluid is produced by distilling and separating the various oily fractions of the tars which have been produced in the previous operation. The tar which settles out and passes through 7 and 50 into the tar still 51, as before described, is submitted here to a series of special operations. It is first heated to the temperature of boiling water or higher and a current of live or direct steam is transmitted by the perforated pipe 53 through the mass of hot tar. This serves to drive off those oily bodies which are particularly volatile in the vapor of steam and which are contained in all wood tar. When these have been removed, the steam is shut off and the fire is increased in the fireplace 52 to a point where other tar oils not specially volatile with steam are evolved. These latter tar oils are led into the tank 57 and kept separate from the steam volatile oils which have been run into tank 56 and which are useful for other purposes, but are not desirable as washing oils in this process. These oils in 57 which are substantially non-volatile in steam are pumped in a continuous stream by pump 19 into the top of the scrubber 14 through 18$^b$ or into and through the top Burcey pan 23 through the pipes 18. These oils have several functions in the scrubbers, firstly, to absorb the tar and oils in these gases and, secondly, to keep the tar in them liquid by dissolving the hard tar which otherwise will form in and clog the apparatus. Another function is that of cooling the vapors to the desired point. These scrubbing oils must be liquid at the working temperature while not particularly volatile with the water vapor contained in the gases from the retorts. They must also serve to absorb and remove as much as possible of those steam-volatile oils which are always present. Steam volatile oils should therefore be fractionated away from the collected body of tar and the oils not particularly volatile with steam used for washing as described. As these washing oils continuously return to the tar still, it is only necessary to use a fraction of them in the circulation and the remainder can from time to time be removed from the circulation and otherwise disposed of. The gas and vapor passing from this scrubbing operation are freed to a great extent from the impurities which would otherwise contaminate the desired final products, acetates and alcohol. The vapors freed from tar and containing all the volatile acids together with the water and wood spirit pass from the scrubbers 14 and 20 through 24 into the absorbing apparatus 25 which is a countercurrent apparatus similar to the scrubber 14. But in this absorber the vapors meet a countercurrent of alkali, as milk of lime, which enters from the storage tank 26$^a$, through valved pipe 26 which allows a regulated feed of alkali in amount sufficient to neutralize the acids. The vapors meet a progressively stronger alkali solution or suspension as they rise through the higher chambers, which serves to remove all the acid while allowing the water and other volatile constituents to pass on. While it might be possible to condense out the water from the gases coming from this operation at a temperature which would allow a stronger alcohol to pass on for a later condensation, yet I prefer to cool the gases immediately to as low a temperature as possible after the acids have been removed, condensing both alcohol and water and thus obtaining a dilute solution of alcohol in water. This is done in condenser 28 and as the yield of aqueous products from a cord of wood by destructive distillation is about 220 gallons while the yield of alcohol seldom exceeds ten gallons and as practically all the water and alcohol are in this distillate, the alcoholic content will always be below five per cent. This condensate still contains many of the volatile impurities of the ordinary pyroligneous distillates and I proceed to recover the alcohol therefrom and purify it by a methodical system of fractional distillations and chemical treatments. I first pump the weak liquor from 35 into the still 38 and produce a distillate of between 10 per cent. and 25 per cent. alcoholic contents, which is treated in tank 41, either by simply allowing it to stand or by settling after adding an acid or both. I find these distillates when of acid nature separate the oils better than when neutral or alkaline. In some cases, the oils will rise to the top, in some other cases they settle to the bottom, and in still other cases they are found at both top and bottom. In any case these oils may be removed through the draw-off cocks 42 and 43. The aqueous liquid is drawn into tank 45 and an alkali, preferably milk of lime, is added in such excess that a reaction occurs producing a yellow color. The reaction usually forms a deposit which settles to the bottom of the tank from which the liquid may be removed; but whether this deposit forms or does not, some impurities which were formerly volatile are rendered non-volatile. By this methodical treatment it is possible to obtain a liquid such that if it is again passed through the continuous fractionating still 28 the distillate produced will be of an alcoholic content exceeding 82 per cent. and of such purity that on the addition of water in any proportion it remains perfectly miscible therewith. This is the standard for 82 per cent. crude alcohol and the product may therefore be run directly into barrels for shipment or further treated to produce refined alcohol of 95 per cent. and high strengths for consumption in the arts. While for convenience of illustration I show all the apparatus for the recovery of the valuable by-products as connected to a single retort, I prefer to have some of the apparatus treating in common the product from an entire set of a plurality of retorts. I prefer to have the first temperature-regulating device, the gas bell, the scrubbers, the acetic acid absorbers and the water and wood spirit condensers separate for each retort, as each of these pieces of apparatus must be regulated according to the working of the individual retort, but the tar distilling and circulating apparatus and the alcohol stills, the gas exhausters and lime tub may with advantage work on the common products of all the retorts. This simplifies the plant by requiring only one set of the latter apparatus for each plant. In this case it is well to specialize the apparatus somewhat further. For example, all the tar conduits may lead to a single set of containers, and a pair of tar stills may be used, the still for removing the steam-volatile part of the tar being a separate still. It may be of different construction from that in which the non-steam-volatile part is removed. The steaming still may be a wooden still with steam heating coils in addition to the perforated direct steam coils. The boiling still may then be of iron, fire heated. The condensed tar from the scrubbers will hold considerable acid in it and this acid may be distilled out of the tar and passed through the scrubber with the scrubbing oils. In this case the entering gases in the scrubber may be hotter, the heat being absorbed in vaporizing the acid so introduced. When the alcohol plant is built for a plurality of retorts it is better to have two stills for the two distillations of the alcohol though I have used both systems with one and with two stills, and find both satisfactory. With two stills the secondary one for treating the 10–25 per cent. distillate may be constructed on the so-called French system producing refined 95 per cent. alcohol direct (see U. S. Patents 436,764 and 436,684). I prefer however to produce 82 per cent. by the continuous process and then re-distil in the ordinary kettle and column apparatus as this allows of introducing a small amount of fixed acid, such as sulfuric, to the 82 per cent. alcohol before distillation to retain any amins or other alkaline volatile compounds. It is not desirable to add this acid to the 10–25 per cent. product as it is too impure and the acid would react with the impurities. In absorbing the acid from the gases the lime milk may be diluted to a point which will supply enough water to allow of the solution of the acetate formed. The reaction is exothermic and I find on experiment that if a strong milk of lime is added to absorb the acid that the solution crystallizes in the apparatus. Another way of controlling the strength of the acetate solution is to add water directly to the top of the absorber till the solution running into the evaporating pan 27ª is of the required density.

What I claim is:

1. In the art of wood distillation, the process which comprises leading vapors from a wood distilling retort directly from said retort through a cooling and temperature-regulating device and cooling said vapors therein to a temperature above the condensing point of the volatile acid contained in said vapors and passing said vapors against a current of separately distilled tar oils to remove tar and separately distilling said tar to produce said tar oils as a fraction.

2. In the art of wood distillation, the process which comprises leading vapors from a wood distilling retort into a governing reservoir and withdrawing said vapors from said retort into said reservoir at a rate proportional to the speed of the generation of said vapors.

3. In the art of wood distillation, the process which comprises pre-cooling vapors from a wood distilling retort and washing the pre-cooled vapors in a countercurrent of a separately distilled non-steam-volatile distillate from liquid tar.

4. In the art of wood distillation, the process which comprises generating acid vapors in a wood distilling retort, scrubbing said vapors with a tar oil fraction and absorbing the acid from the scrubbed vapors by a countercurrent of alkali.

5. In the art of wood distillation, the process which comprises producing vapors in a wood distilling retort, scrubbing the vapors with a tar oil fraction, absorbing the acid from the scrubbed vapors, condensing water and wood spirit together from the vapors, distilling the condensate to between 10 and 25 per cent. alcohol, acidifying the distillate, and separating out the oily impurities.

6. In the art of wood distillation, the process which comprises producing vapors in a wood distilling retort, scrubbing the vapors with a tar oil fraction, absorbing the acid from the scrubbed vapors, condensing water and wood spirit together from the vapors, distilling the condensate to between 10 and 25 per cent. alcohol, acidifying the distillate, separating out the oily impurities rendering the residual alcoholic liquid neutral or alkaline and reseparating.

7. In the art of wood distillation, the process which comprises producing vapors in a wood distilling retort, separating the tar, fractionating out a tar oil fraction from said tar and scrubbing said vapors with said volatile oils.

8. In the art of wood distillation, the process which comprises producing vapors in a wood distilling retort, separating the tar, fractionating out tar oils not volatile with steam from said tar and scrubbing said vapors with said non-volatile oils.

9. In the art of wood distillation, the process which comprises distilling wood in a retort under constant pressure, cooling the resultant vapors to a temperature near to but higher than the boiling point of pyroligneous acid, separating the tar, scrubbing the vapors with tar oils non-volatile with steam, passing the scrubbed vapors against a countercurrent of alkali at a temperature near but above 100° C., condensing the purified vapors and withdrawing the non-condensed gases to regulate the pressure within said retort.

10. In the art of wood distillation, an apparatus comprising a wood retort, means for removing the gases and vapors therefrom in a direct ratio to the speed of generation of such vapors and gases, and means for cooling the removed gases to a temperature above the boiling point of pyroligneous acid and removing tar from cooled gases.

11. In the art of wood distillation, an apparatus comprising a wood distilling retort having a vapor exit, a pre-cooling conduit communicating with said vapor exit, a scrubbing apparatus communicating with said conduit and means for feeding said scrubber with tar oils.

12. In the art of wood distillation, an apparatus comprising a wood distilling retort having a vapor exit, a pre-cooling conduit communicating with said vapor exit, a scrubbing apparatus communicating with said conduit and means for feeding said scrubber with tar oils, there being pressure-regulating means interposed between said retort and said scrubbing apparatus.

13. In the art of wood distillation, an apparatus comprising a wood distilling retort having a vapor exit, a pre-cooling conduit connected to said orifice, a pressure-regulating bell into which said conduit opens, means for scrubbing and condensing condensible portions of vapors beyond said bell, means for producing suction throughout the system and means for regulating said suction controlled by said bell.

14. In the art of wood distillation, an apparatus comprising a wood distilling retort having a vapor exit, means for carrying vapors through said exit into an adjustable float, a casing containing said float, a conduit beyond said float, means for producing diminished pressure within said conduit and means for regulating said pressure, the float being so connected with the regulating means that on rising the regulating means open and vapors are drawn through the system in proportion to the speed of generation.

15. In the art of wood distillation, an apparatus comprising a wood distilling retort, a gas cooler taking vapors therefrom, a pressure regulator connected to the cooler, a scrubber beyond the pressure regulator and a temperature-controlling device beyond the scrubber, said temperature-controlling device having means for passing vapors through progressively cooler spaces.

16. In the art of wood distillation, an apparatus comprising a wood distilling retort, a gas cooler taking vapors therefrom, a pressure regulator connected to the cooler, a scrubber beyond the pressure regulator and a temperature-controlling device beyond the scrubber, said temperature-controlling device having means for passing vapors through progressively cooler spaces and means for passing the vapors therefrom through a chamber containing alkali.

17. In the art of wood distillation, an apparatus comprising means for destructively distilling wood, means for scrubbing the products of said destructive distillation in a countercurrent of tar oils not volatile with steam and means for fractionating tar to produce said oils.

18. In the art of wood distillation, an apparatus comprising means for destructively distilling wood, means for scrubbing the products of said destructive distillation with tar oils not volatile with steam, means for fractionating tar to produce said oils and means for producing a continuous flow of said oils through the scrubbing means.

19. In the art of wood distillation, an apparatus comprising means for destructively distilling wood, means for pre-cooling the vapors, means for separating tar, means for fractionally distilling said tar and means for scrubbing the gas with a fraction of the distillate from the tar.

20. In the art of wood distillation, the process which comprises generating acid vapors in a wood distilling retort, scrubbing said vapors with a tar oil fraction and absorbing the acid from the scrubbed vapors by a countercurrent of alkali.

21. In the art of wood distillation, the process which comprises producing vapors in a wood distilling retort, scrubbing the vapors with tar oils, absorbing the acid from the scrubbed vapors, condensing water and wood spirit together from the vapors, distilling the condensate to between 10 and 25 per cent. alcohol, acidifying the distillate, and separating out the oily impurities.

22. In the art of wood distillation, the process which comprises producing vapors in a wood distilling retort, scrubbing the vapors with tar oils, absorbing the acid from the scrubbed vapors, condensing water and wood spirit together from the vapors, distilling the condensate to between 10 and 25 per cent. alcohol, acidifying the distillate, separating out the oily impurities rendering the residual alcoholic liquid neutral or alkaline and reseparating.

23. In the art of wood distillation, the process which comprises producing vapors in a wood distilling retort, scrubbing the vapors with a tar oil fraction, absorbing the acid from the scrubbed vapors, condensing water and wood spirit together from the vapors, and distilling the condensate to between 10 and 25 per cent. alcohol.

24. In the art of wood distillation, the process which comprises distilling wood, maintaining the distillation pressure substantially constant by withdrawing the evolved vapors at a rate proportional to the speed of their formation, and passing said vapors in contact with a tar oil fraction liquid at the temperature of operation and non-volatile in steam.

25. In the art of wood distillation, the process which comprises distilling wood, maintaining the distillation pressure substantially constant by withdrawing the evolved vapors at a rate proportional to the speed of their formation and leading said vapors against a countercurrent of tar oils.

26. In the art of wood distillation, the process which comprises distilling wood, maintaining the distillation pressure substantially constant by withdrawing the evolved vapors at a rate proportional to the speed of their formation, and scrubbing said vapors by passing them in contact with a liquid consisting of the high boiling fractions of the distillate from wood tar.

27. In the art of wood distillation, the process which comprises producing vapors in a wood distilling retort, withdrawing said vapors at a rate varying directly with the speed at which the vapors are evolved, cooling the vapors, preparing a high boiling oil fraction by distilling wood tar and scrubbing the cooled vapors therewith.

28. In the art of wood distillation, the process which comprises producing vapors in a wood distilling retort maintaining substantially atmospheric pressure in the retort by withdrawing the product of distillation at a variable rate corresponding approximately to the variable speed of vapor evolution, cooling the vapors to a temperature somewhat above the boiling point of pyroligneous acid, scrubbing said vapors with a countercurrent of separately distilled tar oils, and fractionating back to the scrubber a portion of liquid condensed from the vapors to provide temperature regulation in the scrubber.

29. In the art of wood distillation, the process which comprises distilling wood in a retort at atmospheric pressure, modifying the temperature of the resultant vapor, separating by deposition a portion of the tarry matters in the vapors, and scrubbing the partially purified vapors with separately distilled tar oils.

30. In the art of wood distillation, the process which comprises pre-cooling vapors from a wood distilling retort to a temperature just above the boiling point of pyroligneous acid, washing the pre-cooled vapors with the high boiling fractions of wood tar distillate, absorbing the acids from the purified vapor by hot alkali solution, condensing the remaining alcohol and water in the gases, removing the gases and controlling the speed of removal of the gases to maintain atmospheric pressure on the retort.

31. In the art of wood distillation, the process which comprises distilling wood in a retort at atmospheric pressure, cooling the resultant vapors, allowing part of the tar in the vapors to separate by deposition, and passing the partially detarred vapors against a countercurrent of high boiling tar oils.

32. In the art of wood distillation, the process which comprises separating tar from the vapors generated in a wood distilling retort, fractionating the high boiling oils from the tar so separated, and returning the high boiling oils into contact with said vapors to aid in separating the tar.

33. In the art of wood distillation, the process which comprises separating impurities contained in the vapors generated in a wood distilling retort, isolating certain constituents from the impurities so removed, and employing such isolated constituents in the treatment of the pyroligneous vapors.

34. In the art of wood distillation, the process which comprises producing vapors in a wood distilling retort and purifying said vapors by passing them in contact with a countercurrent of separately distilled tar oils.

35. In the art of wood distillation, an apparatus comprising a retort, a pre-cooler connected thereto and a regulating bell receiving vapors and gases from said pre-cooler, suction means for controlling passage of gases and vapors and connecting means between said regulating bell and said suction means.

36. In the art of wood distillation, an apparatus comprising a retort having a vapor exit, a floatable bell in unobstructed communication with said exit, vapor treating means beyond said bell, suction means beyond said vapor treating means and means for controlling said suction means by the fluctuations of said bell.

37. In the art of wood distillation, the process which comprises producing vapors in a retort under atmospheric pressure and scrubbing the vapors with a countercurrent of high boiling oils fractionated from wood tar, said scrubbing being performed in two stages, the latter stage of said scrubbing being performed under cooling conditions permitting a limited reflux of condensates into the earlier stage to give temperature control of such earlier stage.

38. In the manufacture of wood alcohol, the process which comprises producing a neutral alcoholic distillate of a strength between 10 and 25 per cent., acidifying the same to permit separation of impurities, removing the separated impurities, adding alkali to separate further impurities and re-distilling to produce a miscible alcohol of 80 per cent. or stronger.

39. In the art of wood distillation, an apparatus comprising a retort, a positively pre-cooling conduit with means for withdrawing tar deposits and a pressure regulating bell in open connection and in combination with an apparatus for scrubbing gas by a counter current of separately distilled tar oils.

40. In the art of wood distillation, the process which comprises leading vapors directly from a retort through a cooling and temperature-regulating device and cooling said vapors therein to a temperature above the condensing point of the volatile acid contained in said vapors, separating tar from said vapors, separately distilling said tar and scrubbing said vapors with a tar oil fraction from the distilling operation.

41. In the art of wood distillation, an apparatus comprising a retort, a positively pre-cooling conduit, means for passing vapors from the conduit against a counter current of tar oils, means for passing the vapors against a counter current of alkali, a condenser, and means for producing a variable suction governed by the flow of vapors from the retort, all in vapor connection.

42. The process of removing steam-volatile oils from pyroligneous acid vapors which comprises scrubbing said vapors with a countercurrent of tar oils substantially free from steam-volatile oils.

43. In the art of wood distillation, the process which consists in generating vapors in a retort, sucking said vapors through a counter current of tar oils to remove impurities and maintaining the vapors in the retort at atmospheric pressure.

44. In the art of wood distillation, the process which comprises distilling wood, maintaining the distillation pressure substantially constant by withdrawing the evolved vapors at a rate proportional to the speed of their formation, cooling said vapors to a temperature above the condensing point of volatile acids contained therein, and scrubbing said vapors with a counter current of separately distilled tar oils.

45. In the art of wood distillation, the process which comprises distilling wood, maintaining the distillation pressure substantially constant by withdrawing the evolved vapors at a rate proportional to the speed of their formation, cooling said vapors to a temperature above the condensing point of volatile acids contained therein, scrubbing said vapors with a counter current of separately distilled tar oils, fractionating back to the scrubber a portion of liquid condensed from the vapors to provide temperature regulation in the scrubber and absorbing the acid from the scrubbed vapors by passing said vapors against a counter current of hot alkali solution.

46. In the art of wood distillation, an apparatus comprising a retort having a vapor exit, a floatable bell in unobstructed communication with said exit, a device arranged for scrubbing vapors by a counter current of tar oils, suction means beyond said scrubbing device and means for controlling said suction means by the fluctuations of said bell.

47. In a wood distillation apparatus a device comprising means for scrubbing vapors with a counter current of tar oil, and means for subsequently condensing a high boiling fraction from said vapors and returning it to the scrubber to control temperatures therein.

48. In the art of wood distillation, the process which comprises producing vapors in a retort, scrubbing the vapors with a counter-current of high boiling oils fractionated from wood tar, said scrubbing being performed in two stages and in the second stage the vapors being positively cooled to a limited extent.

49. In an apparatus for wood distillation, a retort, a vapor receiving bell in free vapor connection with said retort and arranged to control vapor pressure within the retort by varying the speed of withdrawal of said vapors upon change of volume of its vapor contents, and an apparatus arranged for scrubbing vapors with a separately distilled tar oil fraction.

50. In an apparatus for wood distillation a retort, a vapor conduit, a vapor receiving bell in free vapor connection with said retort and arranged to control vapor pressure within the retort by varying the speed of withdrawal of said vapors upon change of volume of its vapor contents, means for scrubbing vapors with a separately distilled tar oil fraction, means for passing vapors against a counter-current of alkali, a condenser and vapor conduits connecting the said elements in sequence to variable suction means controlled by said bell.

51. In a wood distillation apparatus, the combination with a retort, a pressure-regulating device in open communication with said retort, and means for cooling the vapors on their way from the retort to said pressure regulating device, of means for fractionating tar oils from tar, and means for scrubbing the vapors from the pressure-regulating device with said fractionated tar oils, to remove tar and light oils from said vapors.

52. In the art of wood distillation, the process which comprises generating vapors in a retort at atmospheric pressure, positively precooling said vapors, scrubbing with tar oils, passing the purified vapors through alkali to absorb acids, and condensing alcohol and water from the residual neutral vapors.

53. In the art of wood distillation the process which comprises distilling wood in a retort, scrubbing the resultant vapors with tar oils, absorbing the acid from the scrubbed vapors, condensing water and wood spirit together from the vapors and positively controlling the operative pressure throughout the series of process steps.

54. In the art of wood distillation the process which comprises distilling wood, collecting the pyroligneous vapors, removing the impurities and the valuable constituents therefrom, and withdrawing the residual gases at a variable rate so as to maintain constant pressure in the various stages of the process, said rate of withdrawal being positively controlled by the fluctuating volume of the crude pyroligneous vapors distilled from the wood.

55. In the art of wood distillation, an apparatus comprising a wood distilling retort having a vapor exit, a conduit leading therefrom, pressure-regulating means connected with said conduit and followed by scrubbing means and acid-absorbing means, means for condensing alcohol vapors, a valved conduit leading from said alcohol condensing means to a suction producing means adapted to operate at constant speed, the valve in said last named conduit being actuated through suitable connecting members by the said pressure-regulating means.

56. In a wood distilling apparatus, a retort having a vapor outlet, a cooling conduit, a vapor receiving and pressure-regulating device in open connection with said vapor outlet, a vapor scrubbing device and a conduit from said scrubbing device connected with suction means regulated independently of the pressure within said scrubbing device.

57. In the art of wood distillation the process which comprises distilling wood and producing vapors, scrubbing the resultant vapors with tar oils, absorbing the acid from the scrubbed vapors, condensing the remaining alcohol and water together from the non-acid vapors, and positively controlling the operative pressure in the wood distilling operation without regard to pressures prevailing in the later operations.

In testimony whereof, I affix my signature in the presence of witnesses.

HARRY O. CHUTE.

Witnesses:
 CLARENCE EDWARDS,
 ROSE MEYERS.